United States Patent [19]

Weber et al.

[11] Patent Number: 4,979,792
[45] Date of Patent: Dec. 25, 1990

[54] MEANS FOR KEEPING KEYING ELEMENTS WITH A CONNECTOR ASSEMBLY

[75] Inventors: Robert N. Weber, Hummelstown; Robert C. Briggs, Newport; Steven P. Owens, Grantville; David D. Sonner, Harrisburg, all of Pa.

[73] Assignee: AMP Incorporated, Harrisburg, Pa.

[21] Appl. No.: 396,582

[22] Filed: Aug. 21, 1989

[51] Int. Cl.⁵ .............................................. G02B 6/36
[52] U.S. Cl. ............................. 350/96.20; 350/96.21
[58] Field of Search ........................... 350/96.20, 96.21

[56] References Cited

U.S. PATENT DOCUMENTS

| | | | |
|---|---|---|---|
| 3,129,993 | 4/1964 | Ross . | |
| 3,387,252 | 6/1968 | Rothweiler . | |
| 4,258,970 | 3/1981 | Bourdon et al. | 339/38 |
| 4,365,858 | 12/1982 | Karol | 339/36 |
| 4,515,434 | 5/1985 | Margolin et al. | 350/96.20 X |
| 4,645,295 | 2/1987 | Pronovost | 350/96.20 |

Primary Examiner—John D. Lee
Assistant Examiner—Phan T. Heartney
Attorney, Agent, or Firm—Gerald K. Kita

[57] ABSTRACT

Means 1 in the form of a cover for a connector assembly 86, a skirt 2' of the cover encircling a front end 4 of the connector assembly 86, connecting means 7 for connecting the cover to the connector assembly 86 when the skirt 2' is removed from the front end 4, internal webs 9, 9 of the cover lodged in a gap 29 in the front end 4 to retaini the cover on the front end 4, and pockets 11, 11, 11 external to the skirt 2' frictionally receiving the keying elements 94, 94', 94" in the absence of any one of the keying elements 94, 94', 94" in the connector assembly 86.

14 Claims, 3 Drawing Sheets

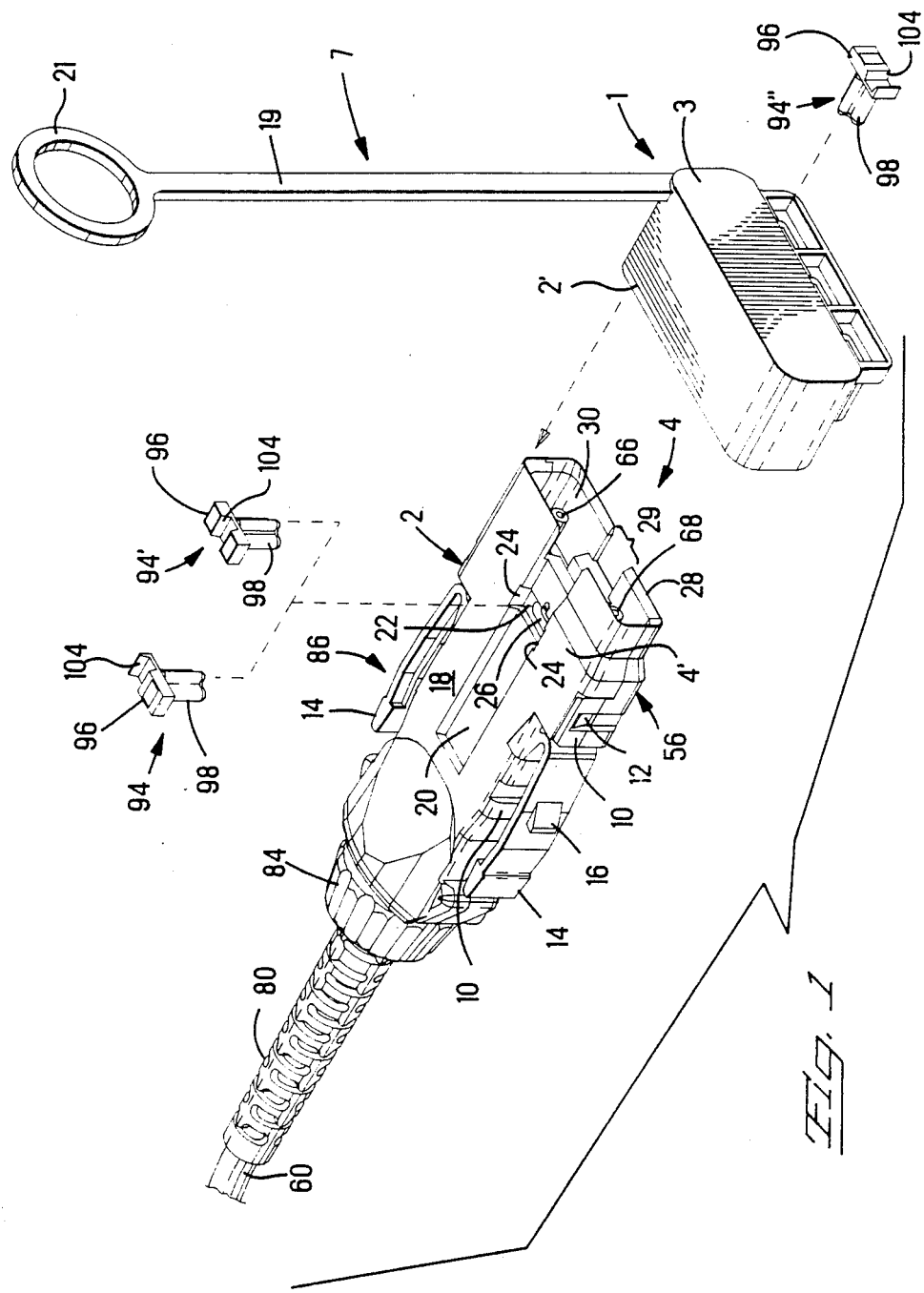

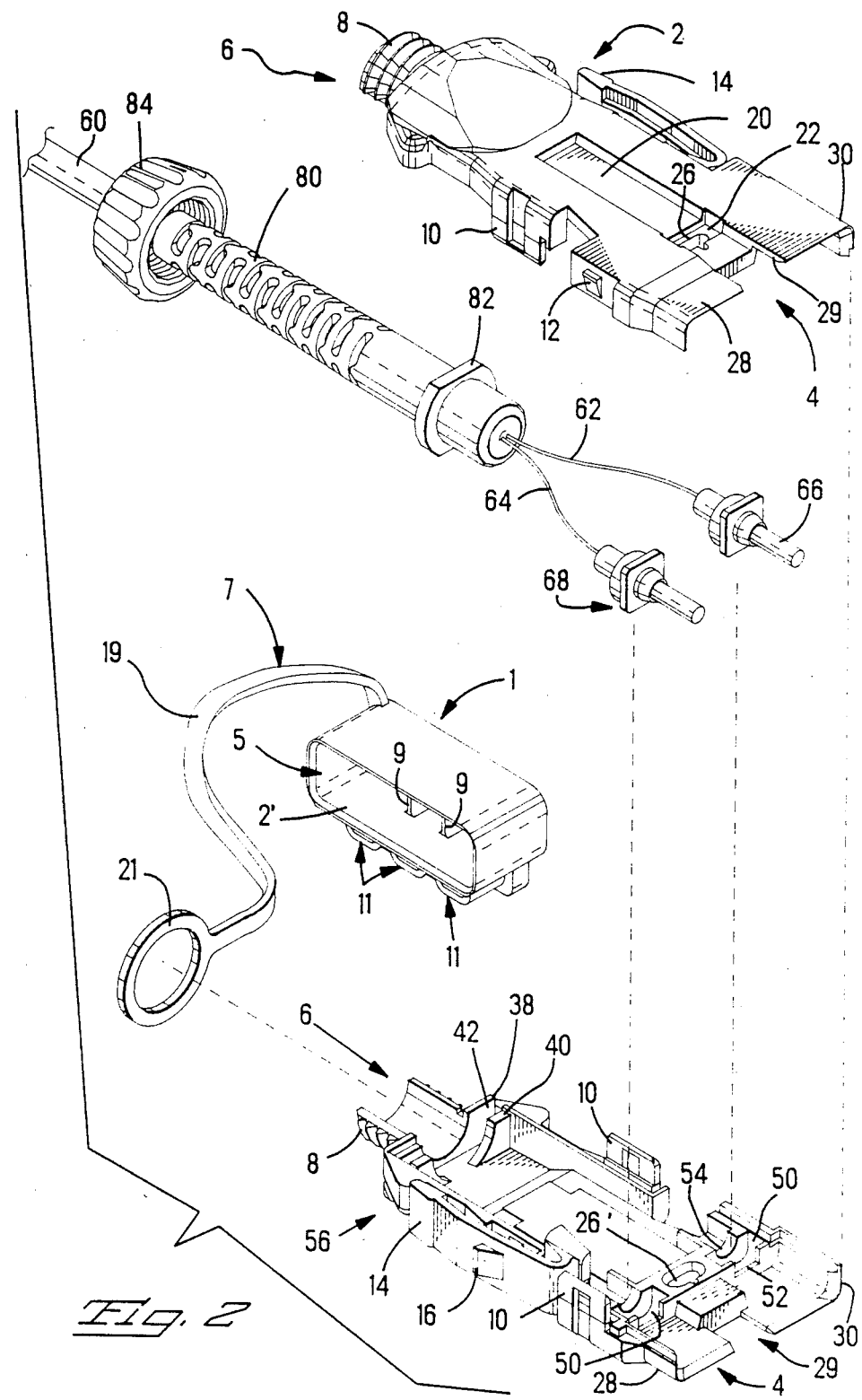

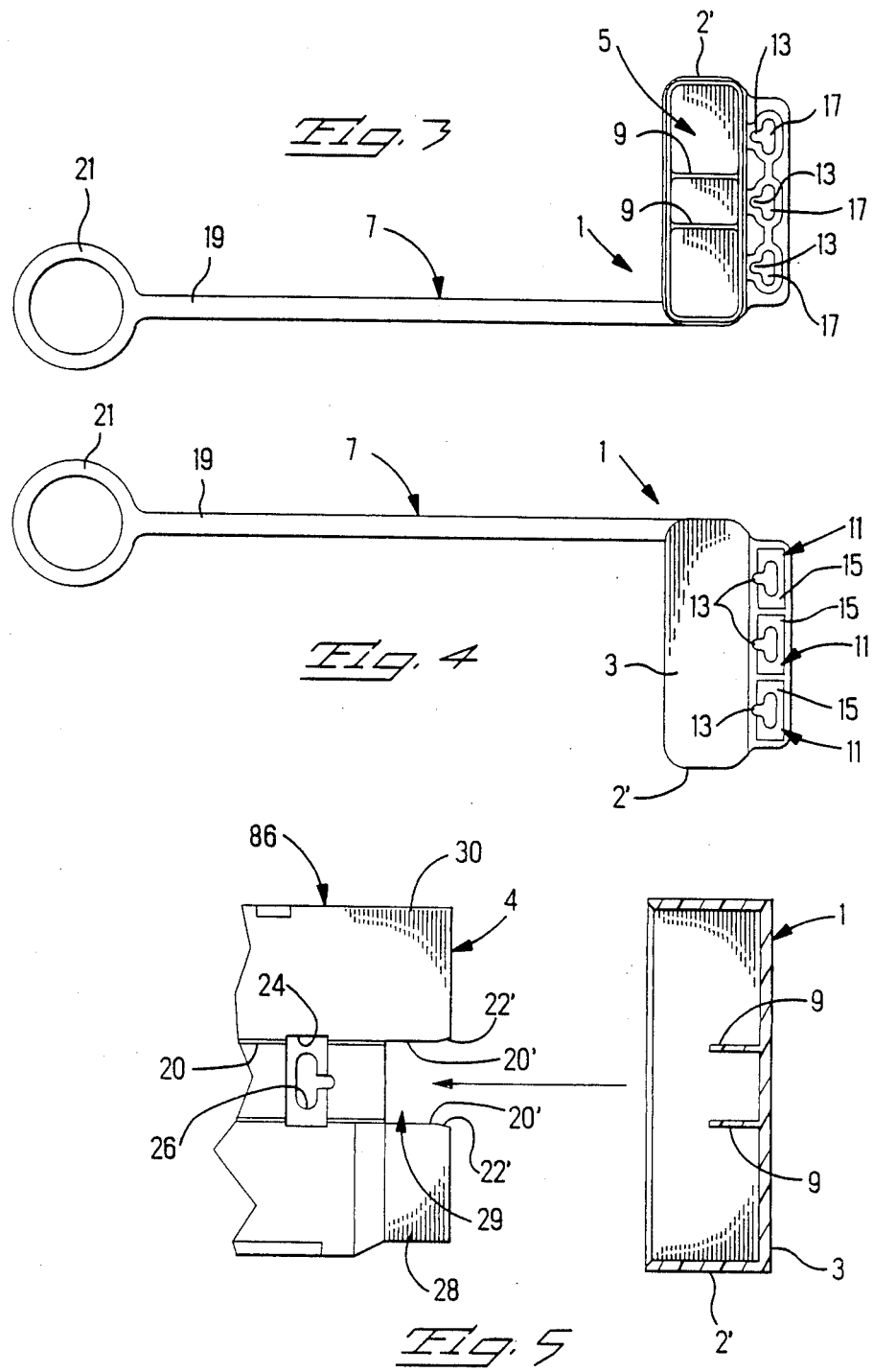

4,979,792

MEANS FOR KEEPING KEYING ELEMENTS WITH A CONNECTOR ASSEMBLY

FIELD OF THE INVENTION

The invention relates to an optical connector adapted with different keying plugs.

BACKGROUND OF THE INVENTION

There is disclosed in application Ser. No. 328,259, filed Mar. 23, 1989, abandoned, a connector assembly for optical fibers adapted with interchangeable keying elements. The keying elements are different from one another, and require means for keeping them with the connector while they are not being used with the connector.

SUMMARY OF THE INVENTION

An objective of the invention is to provide means for storing multiple, interchangeable keying elements with a connector assembly for optical fibers, the means being constructed for assembly with other parts of the connector assembly.

An advantage of the invention resides in means for storing multiple, interchangeable keying elements for a connector assembly for optical fibers, wherein the means operates as a removable cover of the connector assembly for protecting the optical fibers.

In order that the present invention may be more readily understood, reference will now be made, by way of example, to the accompanying drawings.

DESCRIPTION OF THE DRAWINGS

FIG. 1 is a fragmentarY perspective view, shown with parts exploded apart, of a connector assembly for optical fibers adapted with means for keeping multiple keying elements.

FIG. 2 is a fragmentary perspective view of the connector assembly shown with parts exploded apart.

FIG. 3 is a rear elevation view of the means for keeping multiple keying elements.

FIG. 4 is a front elevation view of the means for keeping multiple keying elements. FIG. 5 is a fragmentary plan view partially in section of the connector assembly and the means for keeping multiple keying elements.

DETAILED DESCRIPTION

With reference to FIG. 1, a connector assembly in the form of a plug connector 86 for optical fibers is adapted with means for keeping multiple keying elements. With reference to FIG. 2, the plug connector 86 includes a body portion 2 and a body portion 56. Each of portions 2 and 56 includes a front end 4, a rear portion 6 including a cable entry 8, plug assembly latches 10, plug assembly lugs 12 and a latching arm 14 including a latching lug thereon. Half of a male shroud element 28 and half of a female shroud element 30 are offset at opposite sides of the front end 4. A space or gap 29 is between the shroud elements 28 and 30.

With reference to portion 2, an exterior surface of portion 2 includes a channel 20 and a detent 22 recessed in sides of the channel 20. An aperture portion or keying element receiving passage 26 extends from the detent 22 to the interior of the portion 2. An aperture portion or keying element receiving passage 26' extends from the exterior to the interior of portion 56.

With reference to FIG. 2, optical fibers 62, 64, of a cable 60 for the fibers 62, 64, are terminated by respective ferrules 66, 68. Cable 60 is provided with a strain relief 80 having an integral annular flange 82. An internally threaded nut 84 is also provided.

Upon assembly of the components illustrated in FIG. 2, the ferrules 66, 68 are seated in respective recesses 52, 54 of the portion 56. Flanges 74, 74 of the ferrules 66, 68 are in respective cavities 50, 50 of the portion 56. The flange 82 is received in a slot 42 between ridges 38, 40. Body portion 2 is assembled to portion 56, over the ferrules 66, 68 and the flange 82. Latches 10 of the portion 2 engage and latch against the lugs 12 of the portion 56. Latches 10 of the portion 56 engage and latch against corresponding lugs 12 of the portion 2. Nut 84 is threaded onto the cable entry portions 8, 8 that are provided with external threads. Aperture portions 26 and 26' are brought into end to end relationship, thus, forming a continuous keying element receiving passage through the connector assembly 86. A male shroud at the front end 4 is formed by the shroud elements 30, 30. The male shroud is larger in transverse section than a corresponding transverse section of a female shroud formed at the front end 4 by the shroud elements 28, 28.

With reference to FIG. 1, the connector assembly 86 is adapted with interchangeable keying elements 94, 94', 94", each having a portion 96, of enlarged block form or any form that conforms in size and shape to seat in the detent 22, and a post 98 for extending along the keying element receiving passage formed by the aperture portions 26, 26'. The keying elements 94, 94', 94" include respective keyways 104 extending through the portion 96 at different locations. Thus, each keying element 94, 94', 94" will position a keyway 104 in a different location along the channel 20. The connector assembly 86 is adaptable with any one of the three keying elements 94, 94', 94" or with none, thereby having four different keyed combinations as disclosed further in application Ser. No. 328,259, filed Mar. 23, 1989.

The keying elements 94, 94', 94" will be used one at a time with the connector assembly 86, and require means 1 for keeping them with the connector assembly 86 while they are not being used. The means 1, for example, is in the form of a cover for the connector assembly 86, a skirt 2' of the cover encircling the front end 4 of the connector assembly 86, an end wall 3 unitary with the skirt 2', and extending across the front end 4 and joining with edges of the skirt 2', an open end 5 of the cover along the edges of the skirt 2' and opposite the end wall 3, connecting means 7 for connecting the cover to the connector assembly 86, especially to retain the means 1 to the connector assembly 86 when the skirt 2' is removed from the front end 4, interior webs 9, 9 across the front end 4 and lodged in the gap 29 in the front end 4 to retain the cover on the front end 4, and pockets 11 external to the skirt 2' frictionally receiving keying elements 94, 94', 94" to be individually mounted within a keying element receiving passage 26, 26' in the connector assembly 86, whereby all of the keying elements 94, 94', 94" that are interchangeable with one another are retained in the cover in the absence of any one of the keying elements 96, 96', 96" in the passage 26, 26'.

Insertion and retraction of the keying elements 94, 94', 94" from corresponding pockets 11 is accommodated. The shape of each of the pockets 11 conforms to the shape of a corresponding one of the keying elements 94, 94', 94". The resiliently deformable material, Santoprene thermoplastic rubber, available from Monsanto Chemical Co., Akron, Ohio, of the means 1 is chosen for flexure to accommodate insertion and retraction. A groove 13 of each pocket 11 communicates with the interior of the pocket 11 and permits expansion and contraction and flexure of the pocket 11 to reduce frictional resistance to insertion and extraction. Each groove 13 extends through to open ends 15, 17 of the corresponding pocket 11. The keyway 104 of each keying element 94, 94', 94" is positioned at a corresponding larger open end 15 for identification. A smaller open end 17 permits the application of pressure against a corresponding post 98 of a keying element 94, 94', 94" to extract the same from the pocket 11.

The webs 9, 9 face toward the open end 5 and are spaced apart. The gap 29 intersects sides 20', 20' of the channel 20, and the webs 9, 9 extend along the channel 20 and frictionally engage the sides 20', 20' to retain the cover on the connector assembly 86.

With reference to FIG. 5, the sides 20', 20' of the channel 20 extend to the front end 4, and have outwardly flared portions 20", 20" at the front end 4. The webs 9, 9 are inserted between the outwardly flared portions 20", 20" and are funneled along the channel 20 by the outwardly flared portions 20", 20".

A cross section profile of the front end 4 is asymmetrical, due to the male shroud 30 and the female shroud 28. The connector assembly 86 has a symmetrical cross section profile 4' behind of the front end 4. The skirt 2' extends to encircle both the asymmetrical cross section profile and the symmetrical cross section profile 4'. The friction of the webs 9, 9 retains the cover, when the friction of the skirt 2' alone is inadequate due to the skirt 2' being symmetrical in profile, and nonconforming to the asymmetry of the front end 4.

The connecting means 7 comprises; a lanyard 19 unitary with the skirt 2', a loop 21 at a free end of the lanyard 19 encircling the rear 6 of the connector assembly 86, and the nut 84 larger in circumference than the circumference of the loop 21, the nut 84 being connected to the rear 6 of the connector assembly 86 and engaged against the loop 21. With reference to FIG. 2, during assembly, the ferrules 66, 68 and the fibers 62, 64 and the flange 82 are passed through the loop 21, and are assembled to the portions 2, 4. The loop 21 encircles the cable receiving portions 8, 8, and the nut 84 is assembled, to clamp the loop 21 between the nut 82 and the rear 6 of the connector assembly 86.

Each of the discussed advantages, features and objectives of the disclosed invention exists independently and contributes to the use and importance of the invention.

We claim:

1. A connector assembly comprising: an optical fiber connector, a keying element receiving passage in the connector, the connector being adapted with keying elements for use one at a time in the passage, and means applied to the connector for keeping the keying elements with the connector assembly while they are not being used in the passage.

2. A connector assembly as recited in claim 1, wherein the improvement comprises:
said means includes a cover for the connector assembly, a skirt of the cover encircling a front end of the connector, connecting means for connecting the cover to the connector when the skirt is removed from the front end, internal webs across of the cover lodged in a gap in the front end to retain the cover on the front end, and pockets external to the skirt frictionally receiving the keying elements, whereby all of the keying elements that are interchangeable with one another are retained in the cover in the absence of any one of the keying elements in the passage.

3. A connector assembly as recited in claim 2, wherein the connecting means comprises; a lanyard unitary with the skirt, a loop at a free end of the lanyard encircling a rear of the connector, and a nut larger in circumference than the circumference of the loop, the nut being connected to a rear of the connector and engaged against the loop.

4. A connector assembly as recited in claim 2, comprising; the connector has an axially extending channel in an external surface, the gap intersects sides of the channel, and the webs extend along the channel and frictionally engage sides of the channel to retain the cover on the connector.

5. A connector assembly as recited in claim 1, wherein the connector has an axially extending channel in an external surface, sides of the channel extend to the front end of the connector and have outwardly flared portions at the front end of the connector, and the webs are freely inserted between the outwardly flared portions and are funneled along the channel by the outwardly flared portions.

6. A connector assembly as recited in claim 2, wherein a cross section profile of the front end of the connector is asymmetrical, the connector has a symmetrical cross section profile rearward of the front end, and the skirt extends to encircle the asymmetrical cross section profile and the symmetrical cross section profile.

7. A connector assembly as recited in claim 3, comprising; the connector has an axially extending channel in an external surface, the gap intersects sides of the channel, and the webs extend along the channel to retain the cover on the connector.

8. A connector assembly as recited in claim 2, wherein the connector has an axially extending channel in an external surface, sides of the channel extend to the front end of the connector and have outwardly flared portions at the front end of the connector, and the webs are freely inserted between the outwardly flared portions and are funnelled along the channel by the outwardly flared portions.

9. A connector assembly as recited in claim 3, wherein the connector has an axially extending channel in an external surface, sides of the channel extend to the front end of the connector and have outwardly flared portions at the front end of the connector, and the webs are freely inserted between the outwardly flared portions and are funnelled along the channel by the outwardly flared portions.

10. A connector assembly as recited in claim 4, wherein the sides of the channel extend to the front end of the connector and have outwardly flared portions at the front end of the connector, and the webs are freely inserted between the outwardly flared portions and are funnelled along the channel by the outwardly flared portions.

11. A connector assembly as recited in claim 2, wherein a cross section profile of the front end of the connector is asymmetrical, the connector has a symmetrical cross section profile rearward of the front end, and the skirt extends to encircle the asymmetrical cross section profile and the symmetrical cross section profile.

12. A connector assembly as recited in claim 3, wherein cross section profile of the front end of the connector is asymmetrical, the connector has a symmetrical cross section profile rearward of the front end, and the skirt extends to encircle the asymmetrical cross section profile and the symmetrical cross section profile.

13. A connector assembly as recited in claim 4, wherein a cross section profile of the front end of the connector is asymmetrical, the connector has a symmetrical cross section profile rearward of the front end, and the skirt extends to encircle the asymmetrical cross section profile and the symmetrical cross section profile.

14. A connector assembly as recited in claim 5, wherein a cross section profile of the front end of the connector is asymmetrical, the connector has a symmetrical cross section profile rearward of the front end, and the skirt extends to encircle the asymmetrical cross section profile and the symmetrical cross section profile.

* * * * *